Feb. 24, 1931. L. H. STUART 1,794,256
ENGINE SLIDE VALVE
Filed Sept. 8, 1928
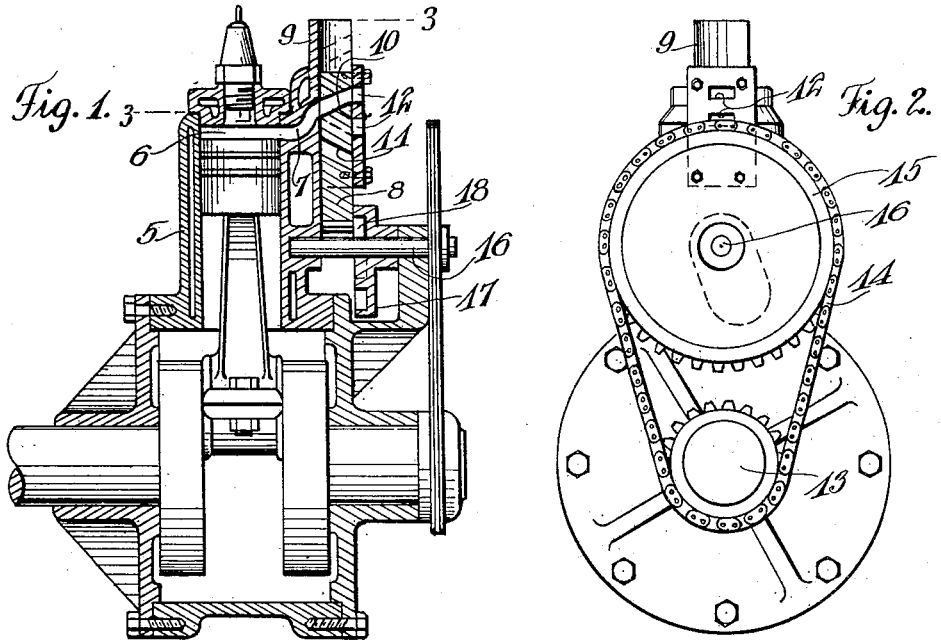
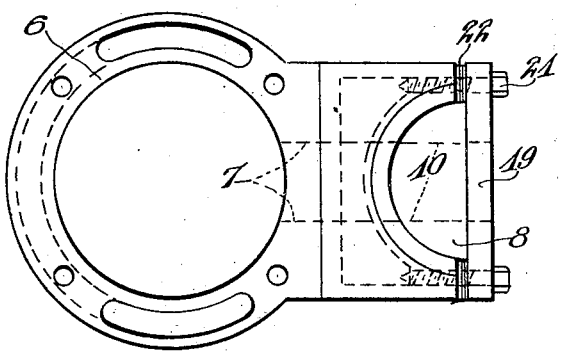
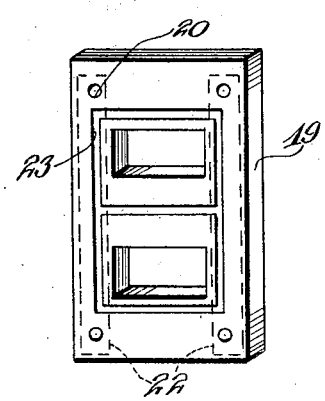
Inventor:-
Luttrell H. Stuart.
Attorneys.

Patented Feb. 24, 1931

1,794,256

UNITED STATES PATENT OFFICE

LUTTRELL H. STUART, OF CHICAGO, ILLINOIS

ENGINE SLIDE VALVE

Application filed September 8, 1928. Serial No. 304,652.

My invention relates to valves for internal combustion engines, and more particularly to the valve for the inlet and exhaust and it is my main object to provide a valve of the sliding type which is compression-tight.

A further object of the invention is to provide novel means whereby the fit of the valve may be regulated to a nicety, whereby to reduce friction to a negligible degree.

Another object of the invention is to design the novel valve so as to be amply cooled.

A final, but nevertheless important object of the invention is to construct the novel valve with few and simple parts.

With the above objects in view and any others that may suggest themselves from the specification and claims to follow, a better understanding of the invention may be gained by reference to the accompanying drawing, in which—

Figure 1 is a section of the novel valve, as incorporated in a typical internal combustion engine;

Figure 2 is a side elevation of the showing in Figure 1, looking from the right;

Figure 3 is a plan view of the engine cylinder itself, showing the valve construction adjoining the same.

Figure 4 is a perspective view of a plate embodied in the valve mechanism.

My valve is an improvement over that type of slide valves for internal combustion engines in which the valve contains two passages in consecutive order, each of these being adapted to register with a duct leading into the engine cylinder at one end, and respectively with the inlet and exhaust ports of the engine at the other end. To illustrate, 5 denotes the engine, 6 the combustion chamber, 7 the duct leading into the latter, 8 the slide valve, 9 the housing therefor, 10 one of the passages in the valve and 11 the other passage therein.

As noted, the passages 10 and 11 converge on the side of the engine so that they may register in turn with the engine duct 7 as the valve is slid through a comparatively limited stroke. As each passage registers with the duct 7, it also registers with the port 12 of the inlet or exhaust, as the case may be. Any suitable gearing may be used to induce the reciprocation of the valve in proper timing relation to the operation of the engine, one such gearing being illustrated. Thus, a pinion 13 on the engine shaft is connected by a chain 14 to a half-speed gear 15 at a point above, the shaft 16 of this gear carrying a cam 17 of the internal type to propel a follower 18 carried by the valve 8. However, any suitable gearing may be employed to operate the valve.

Valves of the type described have generally been made in cylindrical form, and occasionally in plate form, but I have found it more expedient to construct a valve in semi-cylindrical form or having a segmental cross-section. The housing 9 is accordingly gouged to seat the rounded side of the valve toward the engine and present the flat side externally thereof. Needless to say, the valve and its housing or seat are not only machined to fit, but ground to make a hermetical seal.

The valve is held in its seat or housing by a plate 19 applied to the flat side of the valve from without, and perforated near its side edges as indicated at 20 to permit bolts 21 to screw into the housing and serve to secure the plate to the same. This means of securing the valve in the housing is of a general nature, and is nonadjustable since it is necessary for the bolts to be screwed tight to the housing in order to secure the plate firmly to the same. In order to adjust the pressure of the plate upon the valve to such a degree that the valve will both seat snugly yet have a sufficient clearance to slide without appreciable friction, I introduce shims 22 between the plate 19 and the lateral portions of the valve housing 9. I apply the shims vertically as indicated more clearly by dotted lines in Figure 4, passing the bolts through the shims as the plate is secured. The shims are of very thin copper, or other suitable metal and permit of a very fine adjustment in thickness by the removal or addition of one or more shims. In the drawing, clearness has necessitated that the shims be shown of much greater thickness than would actually be the case, but it will be understood that with the shims practically the thickness of films, the position of the plate may be adjusted carefully with relation to the valve 8 that the latter will both seat firmly against the cylinder yet have the minute clearance necessary for its sliding action.

Internal combustion engines usually present difficulties in their valve mechanisms on account of expansion of the parts as a result of heat. I have considered this most important item, and found from actual demonstration in a full-sized engine that the shims may be so adjusted as to absorb what expansion may develop as the engine assumes an operating temperature. For practical purposes due allowance may be made whereby more clearance may be had while the engine is cold and in the process of warming up, and just the proper clearance had when the engine has attained its usual temperature by initially adjusting the shims in keeping with the factor of expansion.

For the sake of lubrication, I believe it of advantage to groove the inner side of the plate 19 about the ports 12 as indicated at 23 so that the oil supply to the valve may be spread along the same on the outer side; and the inner side of the valve or its seat may be scored or otherwise finely grooved in keeping with modern sleeve valve practice to maintain these parts lubricated along their contacting surfaces.

It will be seen that the improved valve is a comparatively simple structure. While I do not claim novelty for the design of the passages in the valve or the gearing therefor, yet I do believe it novel to construct the valve in semi-circular or segmented form and to seat the same with its rounded surface opposite the cylinder of the engine. This position of the valve is of advantage because the passages between the cylinder and the valve must be sealed compression-tight in order for the valve to operate efficiently, and this seal I obtain first by seating the valve in a pocket of its own form and second by giving it a finely adjusted clearance to combine the sealing value with freedom of motion. Further, the simplicity of the valve is manifest from the plain design of the valve housing and the closure plate therefor. By limiting the latter in length to extend only slightly beyond the ports 12, as shown, I am able to leave the outer side and ends of the housing 9 open. These parts are thus exposed to a marked degree, enabling them to keep cool to such an extent that water jacketing of the plate and the greater portion of the housing 9 is unnecessary. In fact, the plate is so far removed from the heat of the engine that it may be safely constructed without water jacketing and still maintain the valve in a comparatively cool condition.

I claim:

1. A slide valve for an engine comprising a secondary chamber adjoining the active engine chamber, a valve of semi-cylindrical in cross-section slidable in the direction of its axis in the secondary chamber, the peripheral surface of said valve facing in the direction of the engine chamber and the secondary chamber wall being shaped to seat said surface, a plate forming the outer wall of the secondary chamber and adapted to bear against the flat outer surface of the valve, and shims interposed between the plate and outer ends of the secondary chamber to impart the proper clearance to the valve.

2. A slide valve for an engine comprising a secondary chamber adjoining the active engine chamber, a valve of semi-cylindrical in cross-section slidable in the direction of its axis in the secondary chamber, the peripheral surface of said valve facing in the direction of the engine chamber and the secondary chamber wall being shaped to seat said surface, and an outer closure for the secondary chamber, those portions of the latter which are opposite the ends of the valve being open.

In testimony whereof I affix my signature.

LUTTRELL H. STUART.